(12) United States Patent
Poli

(10) Patent No.: US 12,348,971 B2
(45) Date of Patent: Jul. 1, 2025

(54) SHARED SPECTRUM-CONTROLLER ENFORCEMENT OF A SANCTION CRITERION

(71) Applicant: Outdoor Wireless Networks LLC, Richardson, TX (US)

(72) Inventor: Christopher Poli, Doylestown, PA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 332 days.

(21) Appl. No.: 17/513,952

(22) Filed: Oct. 29, 2021

(65) Prior Publication Data

US 2022/0141668 A1    May 5, 2022

Related U.S. Application Data

(60) Provisional application No. 63/107,718, filed on Oct. 30, 2020.

(51) Int. Cl.
*H04W 12/63* (2021.01)
*H04W 12/069* (2021.01)
(Continued)

(52) U.S. Cl.
CPC ......... *H04W 12/63* (2021.01); *H04W 12/069* (2021.01); *H04W 16/14* (2013.01);
(Continued)

(58) Field of Classification Search
CPC ... H04W 12/63; H04W 12/069; H04W 16/14; H04W 48/04; H04W 64/00; H04W 72/0453; H04W 12/08; H04W 12/66
See application file for complete search history.

(56) References Cited

U.S. PATENT DOCUMENTS 9,775,050 B1 * 9/2017 Wang .................... H04W 16/14
10,912,147 B1 * 2/2021 Gundavelli ........... H04W 48/10
(Continued)

OTHER PUBLICATIONS

K. B. S. Manosha, M. Matinmikko-Blue and M. Latva-aho, "Framework for spectrum authorization elements and its application to 5G micro-operators," 2017 Internet of Things Business Models, Users, and Networks, Copenhagen, Denmark, 2017, pp. 1-8, doi: 10.1109/CTTE.2017.8260941. (Year: 2017).*

(Continued)

*Primary Examiner* — Patrice L Winder
(74) *Attorney, Agent, or Firm* — Fogg & Powers LLC

(57) ABSTRACT

During operation, a computer may receive information specifying a trusted identity of an electronic device in a network that uses a shared-license-access band of frequencies. Then, the computer may access a sanction criterion, which is stored in memory, where the sanction criterion comprises: a qualifying criterion in the shared-license-access band of frequencies associated with the electronic device, a disqualifying criterion in the shared-license-access band of frequencies associated with the electronic device, or both. Moreover, the computer may calculate compliance of the electronic device with the sanction criterion based at least in part on the trusted identity. Next, the computer may selectively perform a remedial action based at least in part on the calculated compliance. Notably, the computer may exclude the electronic device from operating or may allow the electronic device to operate in the shared-license-access band of frequencies in the geographic region or the network.

21 Claims, 5 Drawing Sheets

(51) Int. Cl.
  *H04W 16/14* (2009.01)
  *H04W 48/04* (2009.01)
  *H04W 64/00* (2009.01)
  *H04W 72/0453* (2023.01)

(52) U.S. Cl.
  CPC ........... *H04W 48/04* (2013.01); *H04W 64/00* (2013.01); *H04W 72/0453* (2013.01)

(56) References Cited

U.S. PATENT DOCUMENTS

| | | | |
|---|---|---|---|
| 2008/0222021 A1* | 9/2008 | Stanforth | H04W 72/23 705/37 |
| 2014/0162617 A1* | 6/2014 | Mueck | H04W 8/22 455/418 |
| 2014/0256345 A1* | 9/2014 | Arefi | H04W 12/08 455/454 |
| 2015/0181601 A1* | 6/2015 | Schmidt | H04W 16/14 370/329 |
| 2015/0312697 A1* | 10/2015 | Mueck | H04W 4/50 455/418 |
| 2015/0382201 A1* | 12/2015 | Chou | H04W 16/14 370/329 |
| 2018/0288621 A1* | 10/2018 | Markwart | H04W 16/14 |
| 2019/0058999 A1* | 2/2019 | Gunasekara | H04W 36/22 |
| 2019/0141624 A1* | 5/2019 | Wong | H04W 48/18 |
| 2019/0215693 A1* | 7/2019 | Lee | H04L 63/205 |
| 2020/0213831 A1* | 7/2020 | Tjandra | H04W 12/35 |
| 2021/0120408 A1* | 4/2021 | Pazhyannur | H04L 63/101 |
| 2021/0185752 A1* | 6/2021 | Samuel | H04L 63/0272 |
| 2021/0194728 A1* | 6/2021 | Gundavelli | H04L 12/4633 |
| 2021/0306853 A1* | 9/2021 | Gundavelli | H04W 12/06 |
| 2022/0110079 A1* | 4/2022 | Singh | H04W 12/08 |
| 2022/0400386 A1* | 12/2022 | Furuichi | H04W 56/001 |
| 2022/0417757 A1* | 12/2022 | Gupta | H04W 24/02 |

OTHER PUBLICATIONS

M. Rahman, S. H. Ahmed and M. Yuksel, "Proof of Sharing in Inter-Operator Spectrum Sharing Markets," 2018 IEEE International Symposium on Dynamic Spectrum Access Networks (DySPAN), Seoul, Korea (South), 2018, pp. 1-5, doi: 10.1109/DySPAN.2018.8610473. (Year: 2018).*

* cited by examiner

SHARED SPECTRUM-CONTROLLER ENFORCEMENT OF A SANCTION CRITERION

CROSS REFERENCE TO RELATED APPLICATIONS

This application claims priority under 35 U.S.C. 119(e) to: U.S. Provisional Application Ser. No. 63/107,718, "Shared Spectrum-Controller Enforcement of a Sanction Criterion," filed on Oct. 30, 2020, by Christopher Poli, the contents of which are herein incorporated by reference.

FIELD

The described embodiments relate to techniques for communicating information among electronic devices. Notably, the described embodiments relate to techniques for enforcement of a sanction criterion (such as a regulatory criterion or constraint in a geographic region or a network that uses a shared-license-access band of frequencies) by a shared-spectrum controller, such as a spectrum allocation server (SAS).

BACKGROUND

While many electronic devices communicate with each other via large networks owned by a network operator, small-scale networks associated with entities (such as a company or an organization) are increasingly common. In principle, a small-scale network complements the service offered by the network operator and can offer improved communication performance, such as in a particular venue or environment. In practice, the communication performance of small-scale networks (and large networks) is often constrained by resources, such as bandwidth in a shared communication channel.

In order to address these constraints, additional bands of frequencies are being used by large networks and small-scale networks. For example, the shared-license-access band of frequencies near 3.5 GHz (notably, the 150 MHz of bandwidth between 3.55 GHz and 3.7 GHz) is being used for general-purpose communication. This shared-license-access band of frequencies is referred to as a 'Citizens Broadband Radio Service' or CBRS.

In the CBRS, a radio node (which is sometimes referred to as a 'Citizens Band Service Device' or CBSD) may provide a grant request to a SAS (a cloud-based service that manages wireless communication in the CBRS) to reserve a portion of the spectrum or bandwidth in the shared-license-access band of frequencies for its use. For example, a radio node may request a grant to reserve a specific 5 MHz block of spectrum from the SAS. If the requested portion of the spectrum is available, the SAS may provide a grant response to the radio node with approval of a grant for the requested portion of the spectrum. Then, the radio node may provide a heartbeat request to the SAS to request authorization to transmit in the granted portion of the spectrum. When the radio node receives a subsequent heartbeat response from the SAS, the radio node is authorized to transmit in the granted portion of the spectrum.

Furthermore, there are sometimes constraints on the electronic devices that can be used in certain bands of frequencies or communication systems. For example, there are often regulations on the electronic devices that are allowed to be used in certain regions, such as a country or locality. However, these rules are usually not uniformly applied across a given region.

SUMMARY

A computer that dynamically enforces a sanction criterion in a shared-license-access band of frequencies is described. This computer includes: an interface circuit that communicates with an electronic device in a network that uses the shared-license-access band of frequencies; a memory that stores program instructions and the sanction criterion; and a processor that executes the program instructions. During operation, the computer receives, via the interface circuit, information specifying a trusted identity of the electronic device. Then, the computer accesses the sanction criterion in the memory, where the sanction criterion comprises: a qualifying criterion in the shared-license-access band of frequencies associated with the electronic device, a disqualifying criterion in the shared-license-access band of frequencies associated with the electronic device, or both. Moreover, the computer calculates compliance of the electronic device with the sanction criterion based at least in part on the trusted identity. Next, the computer selectively performs a remedial action based at least in part on the calculated compliance.

Note that the sanction criterion may include a network restriction or a device restriction in a geographic region or in the network. For example, the sanction criterion may include: one or more allowed versions of software used by instances of the electronic device in the geographic region or the network; one or more allowed providers of the software used by the instances of the electronic device in the geographic region or the network; one or more allowed models of the instances of the electronic device in the geographic region or the network; one or more allowed manufacturers of the instances of the electronic device in the geographic region or the network; or an allowed operating time interval of the electronic device in the geographic region or the network. Alternatively, the sanction criterion may include: one or more excluded versions of software used by instances of the electronic device in the geographic region or the network; one or more excluded providers of the software used by the instances of the electronic device in the geographic region or the network; one or more excluded models of the instances of the electronic device in the geographic region or the network; one or more excluded manufacturers of the instances of the electronic device in the geographic region or the network; or an excluded operating time interval of the electronic device in the geographic region or the network.

Moreover, the information may specify location information associated with the electronic device, and the computer may calculate the compliance based at least in part on the location information. Alternatively, the memory may store the location information associated with the electronic device, the computer may access the location information based at least in part on the trusted identity, and the computer may calculate the compliance based at least in part on the location information.

Furthermore, the remedial action may include excluding the electronic device from operating in the shared-license-access band of frequencies in the geographic region or the network. For example, the computer may provide, via the interface circuit, an instruction to the electronic device to cease operating in the shared-license-access band of frequencies in the geographic region or the network. Alternatively, the remedial action may include allowing the electronic device to operate in the shared-license-access band of frequencies in the geographic region or the network. Notably, the computer may provide, via the interface circuit, authorization to the electronic device to operate in the shared-license-access band of frequencies in the geographic region or the network.

Additionally, the shared-license-access band of frequencies may include: a CBRS, a band of frequencies associated with an Institute of Electrical and Electronics Engineers (IEEE) 802.11 communication protocol, and/or a cellular-telephone communication protocol.

In some embodiments, the computer may receive, via the interface circuit, an update to the sanction criterion. In this way, the sanction criterion may be dynamically updated, and the computer may dynamically police the dynamic sanction criterion.

Note that the electronic device may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), an access point, etc.

Moreover, the trusted identity may include a digital certificate.

Furthermore, the sanction criterion may be stored in the memory in a container that is associated with the trusted identity.

Another embodiment provides the electronic device.

Another embodiment provides a computer-readable storage medium with program instructions for use with the computer or the electronic device. When executed by the computer or the electronic device, the program instructions cause the computer or the electronic device to perform at least some of the aforementioned operations in one or more of the preceding embodiments.

Another embodiment provides a method, which may be performed by the computer or the electronic device. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
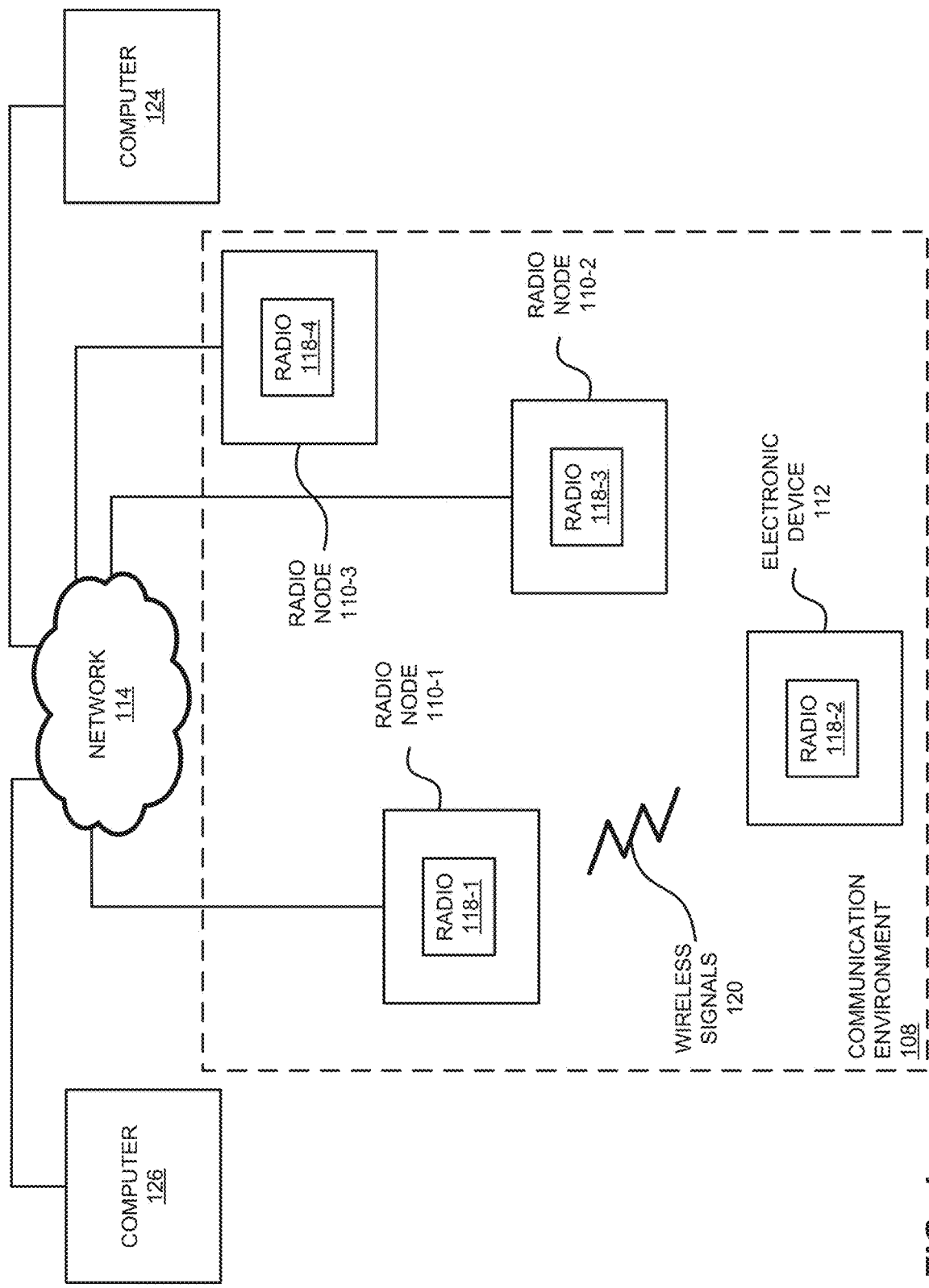
FIG. 1 is a block diagram illustrating an example of communication among a computer, radio nodes and electronic devices in a system in accordance with an embodiment of the present disclosure.

A computer that dynamically enforces a sanction criterion in a shared-license-access band of frequencies is described. During operation, a computer may receive information specifying a trusted identity of an electronic device in a network that uses the shared-license-access band of frequencies. Then, the computer may access the sanction criterion, which is stored in memory, where the sanction criterion comprises: a qualifying criterion in the shared-license-access band of frequencies associated with the electronic device, a disqualifying criterion in the shared-license-access band of frequencies associated with the electronic device, or both. For example, the sanction criterion may include an allowance criterion or an exclusion criterion associated with a geographic region or the network. Moreover, the computer may calculate compliance of the electronic device with the sanction criterion based at least in part on the trusted identity. Next, the computer may selectively perform a remedial action based at least in part on the calculated compliance. Notably, the computer may exclude the electronic device from operating or may allow the electronic device to operate in the shared-license-access band of frequencies in the geographic region or the network.

By dynamically enforcing the sanction criterion, these communication techniques may ensure regulatory compliance and/or communication performance in the network. For example, the computer may know a predetermined or predefined location of the electronic device or the location of the electronic device may be provided to the computer. Based on the location, the computer may restrict the use of the electronic device in the network in a geographic region or a country. Notably, in this way the computer may restrict the use of instances of electronic devices (such as the electronic device) that are associated with a particular manufacturer. Alternatively or additionally, the computer may restrict instances of electronic devices with a version of software (such as an operating system) or software associated with a particular provider. In these ways, the communication techniques may allow the computer to control admission to the network and/or communication equipment used in the network, thereby simplifying and reducing the expense of managing the network and ensuring regulatory compliance.

We now describe some embodiments of the communication techniques. A cellular-telephone network may include base stations (and associated cell towers) that implement so-called 'macrocells.' These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication techniques.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users, which is a non-limiting numerical example) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density, indoor or crowded environments. The use of femto cells and/or small cells can mitigate this challenge.

However, femto and/or small cells are numerous and less centralized than macrocells. This can make it more difficult to manage femto and/or small cells. For example, because of security or communication-performance concerns, particular electronic devices may not be allowed to use a network or may not be allowed to be used in a geographic region or a country. Enforcing such a regulation or constraint (which is sometimes referred to as a 'sanction criterion') in femto and/or small cells can be expensive and complicated.

Moreover, while mobile network operators typically restrict the electronic devices that are used in or that are allowed to access macrocells, other networks do not include such restrictions. For example, open radio access networks or O-RANs (e.g., from the ORAN Alliance of Alfter, Germany; the Telecom Infra Project of Wakefield, Massachusetts; and the Open RAN Policy Coalition of Washington DC, USA) are a new network paradigm in which cellular radio networks include hardware and software components from multiple vendors operating over network interfaces that are truly 'open and interoperable.' However, this network architecture can make it more difficult to enforce a regulation or a constraint, such as in a geographic region of a country.

These challenges are addressed in the communication techniques described below.

In the discussion that follows, Long Term Evolution or LTE (from the $3^{rd}$ Generation Partnership Project of Sophia Antipolis, Valbonne, France) is used as an illustration of a data communication protocol in a cellular-telephone network that is used during communication between one or more radio nodes and an electronic device. Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Texas), Bluetooth (from the Bluetooth Special Interest Group of Kirkland, Washington), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as communication protocol). Thus, the radio nodes may include: an eNodeB, a UMTS NodeB and RNC, an NR gNB or gNodeB, etc.

Moreover, a radio node may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among electronic devices according to some embodiments. Notably, radio nodes 110 can communicate LTE data frames or packets using LTE with an electronic device 112 (which is sometimes referred to as 'user equipment' or UE, such as a cellular telephone and, more generally, a portable electronic device). Again, while LTE is used as an example of a cellular protocol, the embodiments herein are not so limited. Moreover, radio nodes 110 may also communicate (via wireless or wired communication, such as Ethernet, in network 114) with each other and with computer 124 (such as a SAS or a controller).

Figure 2:
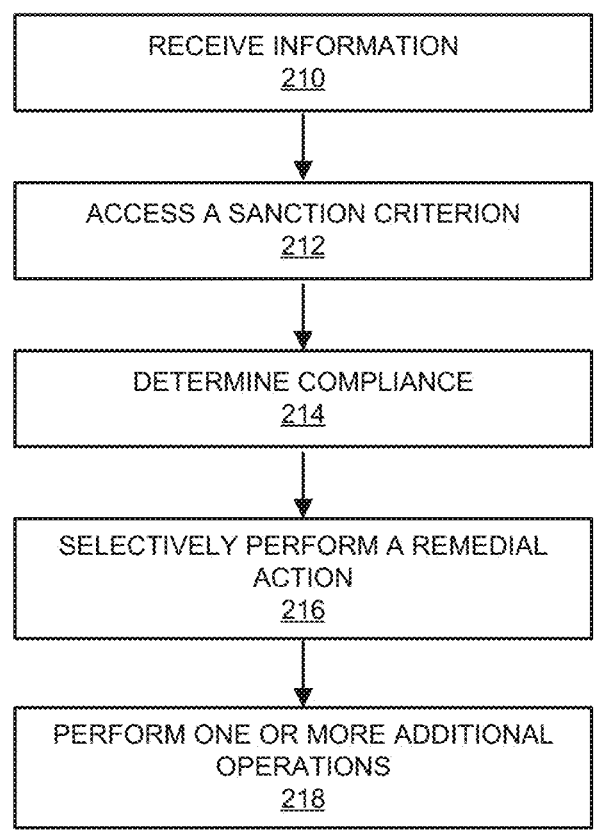
FIG. 2 is a flow diagram illustrating an example of a method for dynamically enforcing a sanction criterion in a shared-license-access band of frequencies using a computer in FIG. 1 in accordance with an embodiment of the present disclosure.

As described further below with reference to FIGS. 2-4, one or more of radio nodes 110 may perform the communication techniques by communicating with computer 124 via network 114. Using radio node 110-1 as an example, this radio node may provide information specifying a trusted identity (such as a digital certificate) of radio node 110-1 to computer 124 via network 114. In response, computer 124 may access a stored sanction criterion, where the sanction criterion comprises: a qualifying criterion in the shared-license-access band of frequencies associated with radio node 110-1 and/or a disqualifying criterion in the shared-license-access band of frequencies associated with radio node 110-1. In some embodiments, the sanction criterion, a counterpart certificate or security information for verification, and/or optional additional information associated with radio node 110-1 (which is discussed further below) is stored in a container in memory that is associated with the trusted identifier (and, thus, radio node 110-1).

Moreover, computer 124 may calculate compliance of radio node 110-1 with the sanction criterion based at least in part on the trusted identity. For example, computer 124 may perform a look-up operation based at least in part on the trusted identity (such as in the container associated with the trusted identity) to calculate whether (or not) radio node 110-1 is allowed to operate in a communication environment 108, such as a communication environment where radio nodes 110 provide a wireless network (such as a small cell) that uses the CBRS. Next, computer 124 may selectively perform a remedial action based at least in part on the calculated compliance.

Note that the sanction criterion may include a network restriction or a device restriction in a geographic region or in the wireless network. For example, the sanction criterion may include: one or more allowed versions of software used by radio nodes 110 in the geographic region or the wireless network; one or more allowed providers of the software used by radio nodes 110 in the geographic region or the wireless network; one or more allowed models of radio nodes 110 in the geographic region or the wireless network; one or more allowed manufacturers of radio nodes 110 in the geographic region or the wireless network; or an allowed operating time interval (such as an hour, a day, a week, a month, a year, etc. or an operating time interval associated with a grant to a portion of the spectrum in a shared-license-access band of frequencies or an operating license) of radio node 110-1 in the geographic region or the wireless network. Alternatively, the sanction criterion may include: one or more excluded versions of software used by radio nodes 110 in the geographic region or the wireless network; one or more excluded providers of the software used by radio nodes 110 in the geographic region or the wireless network; one or more excluded models of radio nodes 110 in the geographic region or the wireless network; one or more excluded manufacturers of radio nodes 110 in the geographic region or the wireless network; or an excluded operating time interval of radio node 110-1 in the geographic region or the wireless network. In some embodiments, the information provided by radio node 110-1 to computer 124 may include or may specify: a version of software used by radio node 110-1, a provide of the version of software used by radio node 1101-1, a model of radio node 110-1, or a manufacturer of radio node 110-1. However, in other embodiments, at least some of this information is already available to computer 124 (e.g., it may be provided to computer 124 by a certified professional installer of radio node 110-1 during a registration or installation processes) and may be stored in the memory (such as in the container associated with the trusted identity).

Furthermore, the information provided by radio node 110-1 to computer 124 may specify location information or a location associated with radio node 110-1, and computer 124 may calculate the compliance based at least in part on the location information. Alternatively, the location information may be stored in the memory (such as in the container associated with the trusted identity), computer 124 may access the location information based at least in part on the trusted identity, and computer 124 may calculate the compliance based at least in part on the location information. For example, computer 124 may use the location information of radio node 110-1 and the sanction criterion to calculate whether radio node 110-1 is allowed to operate in the wireless network in a geographic region, a state or a country.

Additionally, the remedial action may include excluding radio node 110-1 from operating in the shared-license-access band of frequencies in the geographic region or the wireless network. For example, computer 124 may provide, via network 114, an instruction to radio node 110-1 to cease operating in the shared-license-access band of frequencies in the geographic region or the wireless network. Alternatively, the remedial action may include allowing radio node 110-1 to operate in the shared-license-access band of frequencies in the geographic region or the wireless network. Notably, computer 124 may provide, via network 114, authorization to radio node 110-1 to operate in the shared-license-access band of frequencies in the geographic region or the wireless network. In some embodiments, the remedial action may include computer 124: notifying radio node 110-1 to update a version of software used by radio node 110-1; and/or placing radio node 110-1 in a secure subset of the wireless network (such as within a firewall). Thus, the selective remedial action may allow computer 124 to exclude or restrict potential bad actors or security threats in wireless network.

In some embodiments, computer 124 may receive, via network 114, an update to the sanction criterion. For example, the update may be received from a network administrator that is using computer 126. In this way, the sanction criterion may be dynamically updated, and computer 124 may dynamically police the dynamic sanction criterion in the geographic region or the wireless network.

When radio node 110-1 receives authorization from computer 124 to operate in the shared-license-access band of frequencies in the geographic region or the wireless network, radio node 110-1 may provide a grant request to computer 124 to reserve a portion of a spectrum or bandwidth (such as a portion of the spectrum in the shared-license-access band of frequencies or another band of frequencies) for its use. For example, radio node 110-1 may request a grant to reserve 5, 10, 20, 40, 80, 100 or 150 MHz of spectrum in a particular geographic region in the CBRS from computer 124. In response, computer 124 may provide a grant response to radio node 110-1 with approval of a grant for the requested portion of the spectrum.

Then, radio node 110-1 may request from computer 124 authorization to transmit in the granted portion of the spectrum. For example, radio node 110-1 may provide a first instance of a (periodic) keep-alive message (such as a heartbeat request) to computer 124 in order to request authorization to transmit in the granted portion of the spectrum. Notably, radio node 110-1 may provide the first instance of the keep-alive message at a transmit time during a time interval (such as a start of a heartbeat interval or duration). When radio node 110-1 receives, at a receive time prior to prior to a first instance of a transmit expire time, an instance of a keep-alive response from computer 124, then radio node 110-1 may be authorized to transmit in the granted portion of the spectrum until a subsequent instance of the transmit expire time has elapsed.

In these ways, the communication techniques may allow computer 124 to dynamically police or enforce a dynamic sanction criterion on use of the shared-license-access band of frequencies in the geographic region or the wireless network. This may ensure that only authorized electronic devices are allowed to operating in the shared-license-access band of frequencies in the geographic region or the wireless network. Thus, the communication techniques may facilitate simpler and more cost-effective management by computer 124.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic device 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 5:
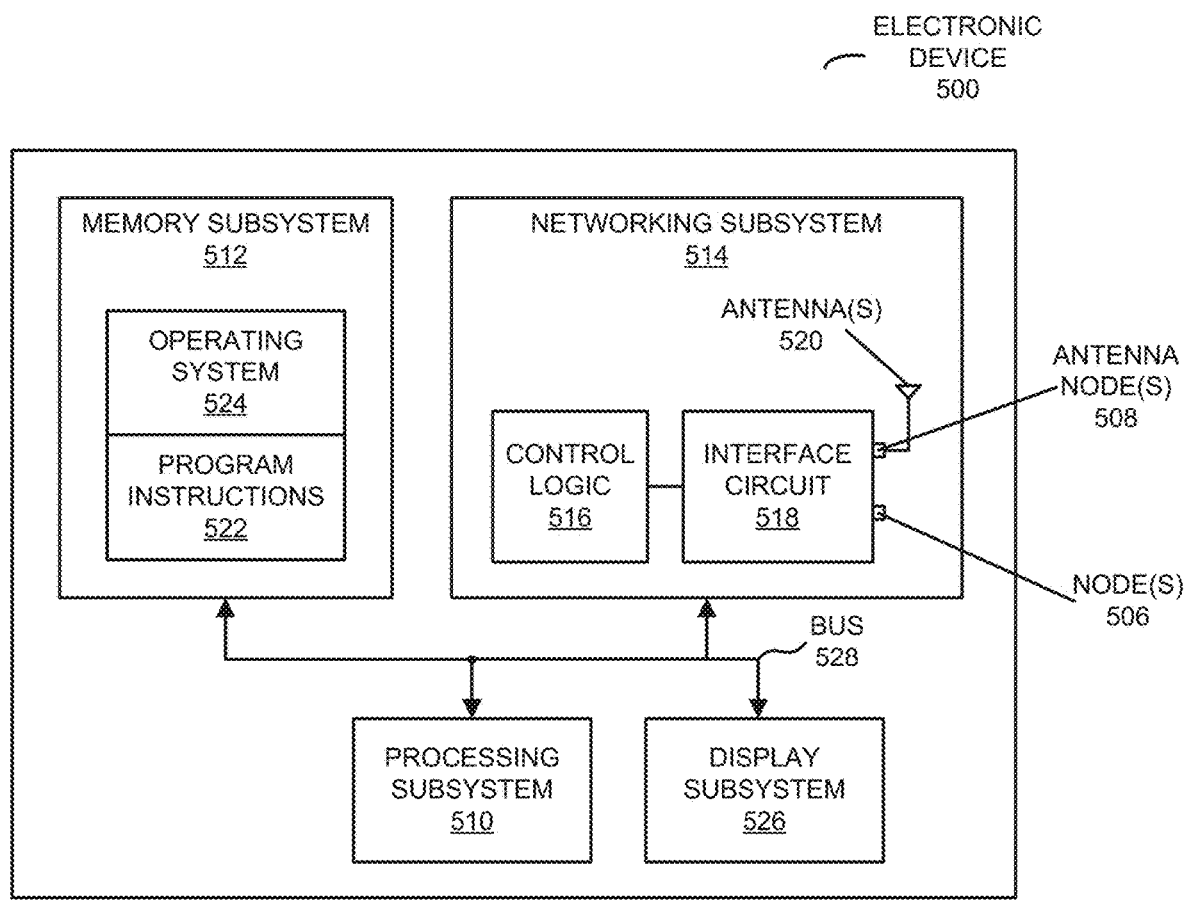
FIG. 5 is a block diagram illustrating an example of an electronic device in accordance with an embodiment of the present disclosure.

As described further below with reference to FIG. 5, radio nodes 11, electronic device 112, computer 124 and computer 126 may include subsystems, such as a networking subsystem, a memory subsystem and a processor subsystem. In addition, radio nodes 110 and electronic device 112 may include radios 118 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 120 (represented by a jagged line) are transmitted by radios 118 in radio nodes 110 and electronic device 112. For example, radio 118-1 in radio node 110-1 may transmit information (such as frames or packets) using wireless signals 120. These wireless signals are received by radios 118 in one or more other electronic devices (such as radio 118-2 in electronic device 112). This may allow radio node 110-1 to communicate information to other radio nodes 110 and/or electronic device 112. Note that wireless signals 120 may convey LTE frames or packets.

In the described embodiments, processing a frame that includes packets in radio nodes 110 and electronic device 112 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving frames that include packets.

We now describe embodiments of the method. FIG. 2 presents a flow diagram illustrating an example of a method 200 for dynamically enforcing a sanction criterion in a shared-license-access band of frequencies, which may be performed by a computer (such as computer 124 in FIG. 1). During operation, an interface circuit in the computer may receive information (operation 210) specifying a trusted identity of an electronic device in a network. For example, the trusted identity may include a digital certificate.

Then, the computer may access the sanction criterion (operation 212), e.g., in memory, where the sanction criterion comprises: a qualifying criterion in the shared-license-access band of frequencies associated with the electronic device and/or a disqualifying criterion in the shared-license-access band of frequencies associated with the electronic device. For example, the sanction criterion may be stored in the memory in a container that is associated with the trusted identity.

Note that the sanction criterion may include a network restriction or a device restriction in a geographic region or in the network. For example, the sanction criterion may include: one or more allowed versions of software used by instances of the electronic device in the geographic region or the network; one or more allowed providers of the software used by the instances of the electronic device in the geographic region or the network; one or more allowed models of the instances of the electronic device in the geographic region or the network; one or more allowed manufacturers of the instances of the electronic device in the geographic region or the network; or an allowed operating time interval of the electronic device in the geographic region or the network. Alternatively, the sanction criterion may include: one or more excluded versions of software used by instances of the electronic device in the geographic region or the network; one or more excluded providers of the software used by the instances of the electronic device in the geographic region or the network; one or more excluded models of the instances of the electronic device in the geographic region or the network; one or more excluded manufacturers of the instances of the electronic device in the geographic region or the network; or an excluded operating time interval of the electronic device in the geographic region or the network.

Moreover, the computer may calculate compliance (operation 214) of the electronic device with the sanction criterion based at least in part on the trusted identity. For example, the information may specify location information associated with the electronic device, and the computer may calculate the compliance based at least in part on the location information. Alternatively, the memory may store the location information associated with the electronic device, the computer may access the location information based at least in part on the trusted identity, and the computer may calculate the compliance based at least in part on the location information.

Next, the computer may selectively perform a remedial action (operation 216) based at least in part on the calculated compliance. The remedial action may include excluding the electronic device from operating in the shared-license-access band of frequencies in the geographic region or the network. For example, the computer may provide, via the interface circuit, an instruction to the electronic device to cease operating in the shared-license-access band of frequencies in the geographic region or the network. Alternatively, the remedial action may include allowing the electronic device to operate in the shared-license-access band of frequencies in the geographic region or the network. Notably, the computer may provide, via the interface circuit, authorization to the electronic device to operate in the shared-license-access band of frequencies in the geographic region or the network.

In some embodiments, the computer may optionally perform one or more additional operations (operation 218). For example, the computer may receive, via the interface circuit, an update to the sanction criterion. In this way, the sanction criterion may be dynamically updated, and the computer may dynamically police the dynamic sanction criterion.

Note that the shared-license-access band of frequencies may include: the CBRS, a band of frequencies associated with an IEEE 802.11 communication protocol, and/or a cellular-telephone communication protocol. Moreover, the radio nodes may include: an eNodeB, a UMTS NodeB and RNC, an NR gNB or gNodeB, an access point, etc.

In some embodiments of method 200, there may be additional or fewer operations. Furthermore, the order of the operations may be changed, and/or two or more operations may be combined into a single operation.

Figure 3:
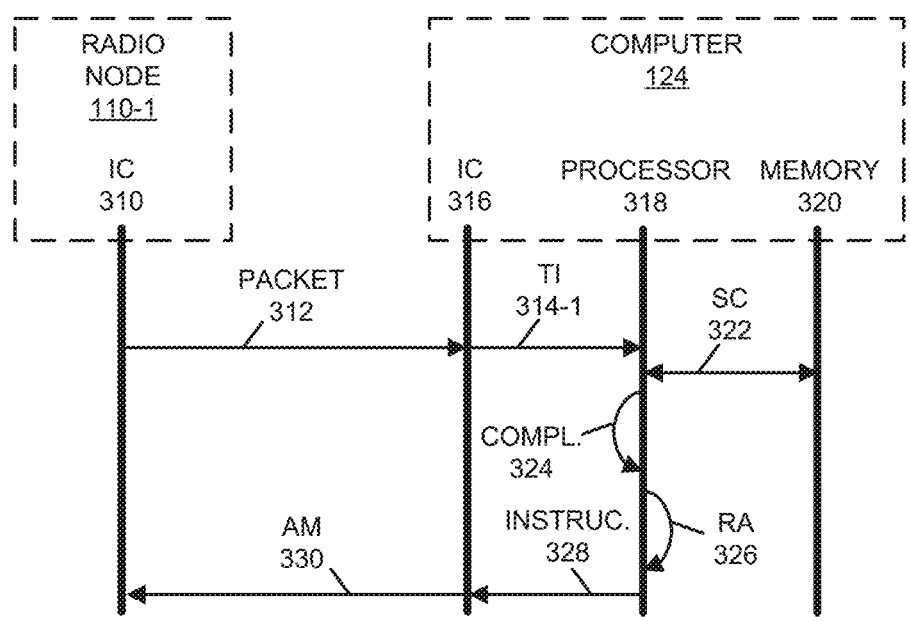
FIG. 3 is a drawing illustrating an example of communication among the electronic devices in FIG. 1 in accordance with an embodiment of the present disclosure.
Figure 4:
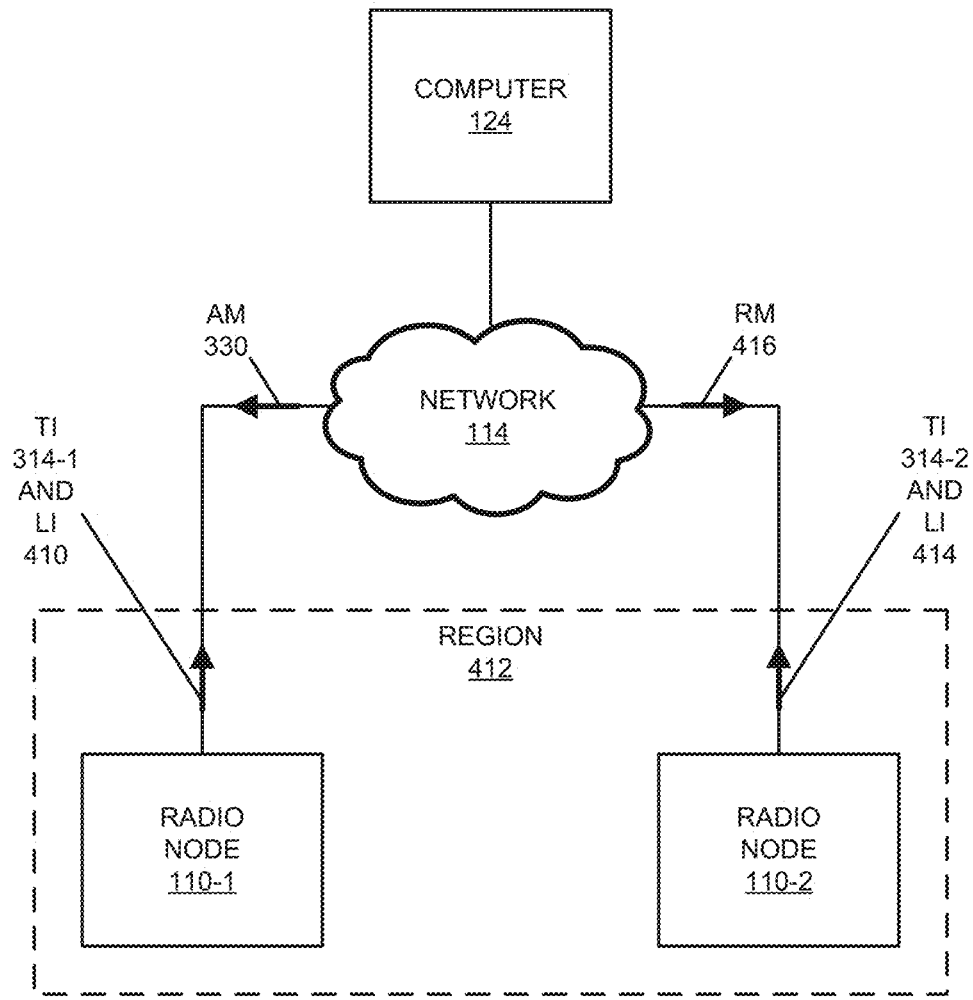
FIG. 4 is a drawing illustrating an example of a technique for dynamically enforcing a sanction criterion in a shared-license-access band of frequencies in accordance with an embodiment of the present disclosure.

Embodiments of the communication techniques are further illustrated in FIG. 3, which presents a drawing illustrating an example of communication among radio node 110-1 and computer 124. In FIG. 3, an interface circuit (IC) 310 in radio node 110-1 may provide a packet 312 or a frame with information specifying a trusted identity (TI) 314-1 of radio node 110-1 in a network.

After interface circuit 316 in computer 124 receives packet 312, interface circuit 316 may extract and provide trusted identity 314-1 to processor 318 in computer 124. In response, processor 318 may access a predefined sanction criterion 322 in memory 320 in computer 124, where the sanction criterion comprises: a qualifying criterion in the shared-license-access band of frequencies associated with radio node 110-1 and/or a disqualifying criterion in the shared-license-access band of frequencies associated with radio node 110-1. For example, processor 318 may access sanction criterion (SC) 322 in a container in memory 320, which is associated with trusted identity 314-1.

Then, processor 318 may calculate compliance 324 of radio node 110-1 with sanction criterion 322 based at least in part on trusted identity 314-1. For example, packet 312 may specify location information associated with radio node 110-1 (such as a location of radio node 110-1), and processor 318 may calculate compliance 324 based at least in part on the location information. Alternatively, memory 320 may store the location information associated with radio node 110-1, computer 124 may access the location information based at least in part on trusted identity 314-1, and computer 124 may calculate compliance 324 based at least in part on the location information. In some embodiments, compliance 324 may be calculated based at least in part on whether radio node 110-1 is allowed to operate at a location specified by the location information (e.g., GPS coordinates, triangulation or trilateration information, or a position in a local positioning system) given sanction criterion 322.

Next, processor 318 may selectively perform a remedial action (RA) 326 based at least in part on the calculated compliance 324. For example, if radio node 110-1 is allowed to operate at the location, processor 318 may instruct 328 interface circuit 316 to provide an authorization message (AM) 330 to radio node 110-1.

While FIG. 3 illustrates communication between components using unidirectional or bidirectional communication with lines having single arrows or double arrows, in general the communication in a given operation in this figure may involve unidirectional or bidirectional communication.

In some embodiments, the communication techniques may allow dynamic enforcement of one or more sanction criteria or policies. This is illustrated in FIG. 4, which presents a drawing illustrating an example of a technique for dynamically enforcing a sanction criterion in a shared-license-access band of frequencies. For example, radio node 110-1 may provide a trusted identifier 314-1 and location information (LI) 410 of radio node 110-1 to computer 124. When radio node 110-1 is located in region 412, computer 124 may use trusted identifier 314-1 and location information 410 to confirm compliance of radio node 110-1 with one or more sanction criteria associated with radio node 110-1 in region 412. Then, computer 124 may provide an acceptance message 330 to radio node 110-1, which may authorize radio node 110-1 to operate in a shared-license-access band of frequencies.

Alternatively, radio node 110-2 may provide a trusted identifier 314-2 and location information 414 of radio node 110-2 to computer 124. When radio node 110-2 is located in region 412, computer 124 may use trusted identifier 314-2 and location information 414 to calculate that radio node 110-2 is not in compliance with one or more sanction criteria associated with radio node 110-2 in region 412. Consequently, computer 124 may provide a rejection message (RM) 416 to radio node 110-2, which may not allow radio node 110-2 to operate in the shared-license-access band of frequencies. Thus, computer 124 may use the communication techniques to perform an admission-control function in a wireless network.

In some embodiments of the communication techniques, a geographic constraint in a shared-access-license band of frequencies or a wireless network is enforced by a controller, such as: a SAS for the CBRS (or similar controllers for emerging European Union equivalents), a Wi-Fi controller, and/or an automated frequency coordination (AFC) or similar spectrum sharing/spectrum-management functions for licensed and/or unlicensed spectrum. These management functions are sometimes collectively referred to as 'controllers' or a 'computers.' The communication techniques may add functionality to controllers to enforce sanctions or other legal controls that sometimes are not uniformly applied across a locality, a region or a country.

Many electronic devices or elements in a network infrastructure have digital certificates that define the identities of these electronic devices, including: a company or manufacturer, a country and/or other identifying attributes. Moreover, during installation of an electronic device, geographic or location information may be provided that can be leveraged by the computer to calculate if the placement is defined as existing infrastructure or a new build-out (or another criterion that can be used to allow or disallow an electronic device onto the network based at least in part on the sanctions or sanction criterion). In order to calculate compliance with a sanction criterion, a computer may need: a definition of one or more sanction criteria defined by a sanction at a geographic location (e.g., existing infrastructure, new build-out, operator size, etc.); and one or more disqualifying criteria (such as manufacturer or provider of an electronic device, country of origin, etc.). The computer may apply the sanction criterion (or sanction criterion), the location information and/or a disqualifier attribute or characteristic of the electronic device to allow or disallow the electronic device to operate in the shared-license-access band of frequencies.

Note that government trade policy sometimes includes limitations on the use of components from certain countries or companies. Notably, the United States banned companies from using certain networking equipment in 2012, and the company in question was added to the Bureau of Industry and Security Entity List by the United States Department of Commerce in May 2019 after an executive order was issued, effectively banning electronic devices from this company from United States communications networks until at least 2021. Such sanction criteria often have qualifying limitations, such as: allowing use in existing infrastructure, but not allowing use in new network build-out; or using company size to ensure sanctions do not unreasonably hurt certain manufacturers or providers or domestic interests (e.g., very small operators, or in order to ensure affordable communication access to rural communities). These limiting criteria can often be tied directly to a geographic region or area, which, in the context of the communication techniques, may be known by the computer.

For example, the CBRS in the United States (as well as similar network infrastructure emerging in the European Union and Wi-Fi wireless local area networks) have control functions, such as the SAS for the CBRS. A SAS controls electronic devices or elements in the network infrastructure, including where and how to operate (such as the frequencies or channels used), but also allowing or denying operation. In CBRS network infrastructure, a radio node or access point that provides access to spectrum and operations may be controlled directly by the SAS or by the SAS through a domain controller. Currently, the control is based on the specific location or placement of the radio node and the use of spectrum by other radio nodes or electronic devices that may be in or external to the CBRS infrastructure. Notably, a primary frequency spectrum user (such as the United States Navy) using spectrum in a given area would cause the SAS to prohibit the CBSD from operating in at least a portion of the CBRS band of frequencies until the primary user is no longer using the spectrum.

In embodiments of the communication techniques, the controlling function (e.g., the SAS) may have access to: a definition of the one or more sanction criteria for a geographic region (such as an exclusion or allowance criterion based at least in part on existing infrastructure, new build-out or operator size); and/or one or more disqualifying criteria (such as a company or country of origin). When an electronic device is entered or deployed into a system, the computer may discover the trusted identity of the electronic device through a digital certificate of the electronic device. This trusted identity may be evaluated against the one or more sanction criteria (and/or the one or more disqualifying criteria) to calculate whether the electronic device is allowed or excluded from operation. If the electronic device is excluded (e.g., if it meets the one or more sanction criteria and/or the one or more disqualifying criteria, such as if the electronic device is deployed or used in a geographic region where it is not designated as allowed), the controlling function (e.g., the computer) may deny the electronic device spectrum and/or may deny authorization to operate. Alternatively, if the electronic device is allowed (e.g., it is deployed or is a qualified electronic device that is designated as being allowed to be used in a geographic region), the controlling function may provide authorization for use/operation in the shared-license-access band of frequencies.

In some embodiments, the communication techniques may be used in conjunction with a previously deployed electronic device that meets a disqualifying criterion. In these embodiments, the electronic device may be allowed to continue to operate or may be excluded from further operations.

In summary, the computer may have access to one or more sanction criteria that can be used to dynamic enforce a constraint. A digital certificate of an electronic device may be used by the computer to establish a trusted identity of an electronic device and to evaluate against the one or more stored sanction criteria. The computer may allow the electronic device into a network based at least in part on the one or more sanction criteria and/or a deployment criterion, which are used to calculate whether the electronic device is compliant. These control functions may support multiple vendors or manufacturers. Note that the one or more sanction criteria may be associated with a standard (such as the $3^{rd}$ Generation Partnership Project, Open Radio Access Network (O-RAN), an IEEE 802.11 standard, etc.) and/or may be codified in a law in a geographic region.

We now describe embodiments of an electronic device, which may perform at least some of the operations in the communication techniques. FIG. 5 presents a block diagram illustrating an example of an electronic device 500 in accordance with some embodiments, such as one of radio nodes 110, electronic device 112, computer 124 or computer 126. This electronic device includes processing subsystem 510, memory subsystem 512, and networking subsystem 514. Processing subsystem 510 includes one or more devices configured to perform computational operations. For example, processing subsystem 510 can include one or more microprocessors, graphics processing units (GPUs), ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program instructions 522 or operating system 524), which may be executed by processing subsystem 510. Note that the one or more computer programs or program modules may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as antenna nodes 508, e.g., a pad, which can be coupled to the one or more antennas 520, or nodes 506, which can be coupled to a wired or optical connection or link. Thus, electronic device 500 may or may not include the one or more antennas 520. Note that the one or more nodes 506 and/or antenna nodes 508 may constitute input(s) to and/or output(s) from electronic device 500.) For example, networking subsystem 514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 500 may be adapted or changed using pattern shapers (such as reflectors) in one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program instructions 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and an LTE communication protocol as an illustrative example, in other embodiments a wide variety of communication protocols and, more generally, wireless communication techniques may be used. For example, instead of Ethernet, a communication protocol that is compatible with the Internet Protocol is used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 522, operating system 524 (such as a driver for interface circuit 518) or in firmware in interface circuit 518. Thus, the communication techniques may be implemented at runtime of program instructions 522. Alternatively or additionally, at least some of the operations in the communication techniques may be implemented in a physical layer, such as hardware in interface circuit 518.

While examples of numerical values are provided in the preceding discussion, in other embodiments different numerical values are used. Consequently, the numerical values provided are not intended to be limiting.

While the preceding embodiments illustrated the use of the communication techniques with the CBRS (e.g., a frequency band near 3.5 GHz), in other embodiments of the communication techniques different wireless signals and/or different frequency band(s) may be used. For example, the wireless signals may be communicated in one or more bands of frequencies, including: 900 MHz, 2.4 GHz, 5 GHz, 6 GHz, 60 GHz, a band of frequencies used by an communication protocol that is compatible with IEEE 802.11 standard, and/or a band of frequencies used by LTE or another cellular-telephone communication protocol. In some embodiments, the IEEE 802.11 standard may include: IEEE 802.11a, IEEE 802.11b, IEEE 802.11g, IEEE 802.11n, IEEE 802.11ac, IEEE 802.11ax, IEEE 802.11be, or another existing or future IEEE 802.11 standard.

Moreover, while the communication techniques were used to enforce one or more sanction criteria on radio nodes 110, in other embodiments the communication techniques were used to enforce one or more sanction criteria on a different type of electronic device, such as electronic device 110.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure.

Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
an interface circuit configured to communicate with an electronic device in a network that uses a shared-license-access band of frequencies;
memory configured to store program instructions and a sanction criterion;
a processor, coupled to the interface circuit and the memory, configured to execute the program instructions, wherein, when executed by the processor, the program instructions cause the computer to perform operations comprising:
receiving, via the interface circuit, information specifying a trusted identity of the electronic device;
accessing the sanction criterion in the memory, wherein the sanction criterion comprises: a qualifying criterion associated with use of the shared-license-access band of frequencies by the electronic device, a disqualifying criterion associated with use of the shared-license-access band of frequencies by the electronic device, or both;
calculating compliance of the electronic device with the sanction criterion based at least in part on the trusted identity; and
selectively performing a remedial action based at least in part on the calculated compliance, wherein the sanction criterion comprises; one or more allowed or excluded models of the instances of the electronic device in the geographic region or the network; and
one or more allowed or excluded versions of software used by instances of the electronic device in a geographic region or the network or one or more allowed or excluded providers of the software used by the instances of the electronic device in the geographic region or the network.

2. The computer of claim 1, wherein the sanction criterion comprises a network restriction or a device restriction in a geographic region or in the network.

3. The computer of claim 1, wherein the sanction criterion comprises: one or more allowed manufacturers of the instances of the electronic device in the geographic region or the network; or an allowed operating time interval of the electronic device in the geographic region or the network.

4. The computer of claim 1, wherein the sanction criterion comprises: one or more excluded manufacturers of the instances of the electronic device in the geographic region or the network; or an excluded operating time interval of the electronic device in the geographic region or the network.

5. The computer of claim 1, wherein the information may specify location information associated with the electronic device, and the calculating of the compliance is based at least in part on the location information.

6. The computer of claim 1, wherein the memory is configured to store location information associated with the electronic device, the operations comprise accessing the location information based at least in part on the trusted identity, and the calculating of the compliance is based at least in part on the location information.

7. The computer of claim 1, wherein the remedial action comprises excluding the electronic device from operating in the shared-license-access band of frequencies in a geographic region or the network.

8. The computer of claim 1, wherein the remedial action comprises providing, via the interface circuit, an instruction to the electronic device to cease operating in the shared-license-access band of frequencies in a geographic region or the network.

9. The computer of claim 1, wherein the remedial action comprises allowing the electronic device to operate in the shared-license-access band of frequencies in a geographic region or the network.

10. The computer of claim 9, wherein allowing the electronic device to operate in the shared-license-access band of frequencies in the geographic region or the network comprises providing, via the interface circuit, authorization to the electronic device to operate in the shared-license-access band of frequencies in the geographic region or the network.

11. The computer of claim 1, wherein the shared-license-access band of frequencies comprises: a Citizens Broadband Radio Service (CBRS), a band of frequencies associated with an Institute of Electrical and Electronics Engineers (IEEE) 802.11 communication protocol, and/or a cellular-telephone communication protocol.

12. The computer of claim 1, wherein the operations comprise receiving, via the interface circuit, an update to the sanction criterion.

13. The computer of claim 1, wherein the electronic device comprises: an Evolved Node B (eNodeB), a Universal Mobile Telecommunications System (UMTS) NodeB and radio network controller (RNC), a New Radio (NR) gNB or gNodeB, or an access point.

14. The computer of claim 1, wherein the trusted identity comprises a digital certificate.

15. The computer of claim 1, wherein the memory is configured to store the sanction criterion in a container that is associated with the trusted identity.

16. The computer of claim 1, wherein calculating compliance comprises performing a lookup operation in a container associated with the trusted identifier.

17. A non-transitory computer-readable storage medium for use in conjunction with a computer, the non-transitory computer-readable storage medium storing program instructions that, when executed by the computer, cause the computer to perform operations comprising:
receiving information specifying a trusted identity of an electronic device in a network that uses a shared-license-access band of frequencies;
accessing a stored sanction criterion, wherein the sanction criterion comprises: a qualifying criterion associated with use of the shared-license-access band of frequencies by the electronic device, a disqualifying criterion associated with use of the shared-license-access band of frequencies by the electronic device, or both;
calculating compliance of the electronic device with the sanction criterion based at least in part on the trusted identity; and
selectively performing a remedial action based at least in part on the calculated compliance, wherein the sanction criterion comprises; one or more allowed or excluded models of the instances of the electronic device in the geographic region or the network; and one or more allowed or excluded versions of software used by instances of the electronic device in a geographic region or the network or one or more allowed or excluded providers of the software used by the instances of the electronic device in the geographic region or the network.

18. The non-transitory computer-readable storage medium of claim 17,
wherein the sanction criterion comprises: one or more allowed manufacturers of the instances of the electronic device in the geographic region or the network; or an allowed operating time interval of the electronic device in the geographic region or the network.

19. The non-transitory computer-readable storage medium of claim 17, wherein the operations comprise accessing stored location information associated with the electronic device based at least in part on the trusted identity; and
wherein the calculating of the compliance is based at least in part on the location information.

20. A method for dynamically enforcing a sanction criterion in a shared-license-access band of frequencies, comprising:
by a computer:
receiving information specifying a trusted identity of an electronic device in a network that uses the shared-license-access band of frequencies;
accessing the sanction criterion, which is stored in memory, wherein the sanction criterion comprises: a qualifying criterion associated with use of the shared-license-access band of frequencies by the electronic device, a disqualifying criterion associated with use of the shared-license-access band of frequencies by the electronic device, or both;
calculating compliance of the electronic device with the sanction criterion based at least in part on the trusted identity, wherein the sanction criterion comprises; one or more allowed or excluded models of the instances of the electronic device in the geographic region or the network; and one or more allowed or excluded versions of software used by instances of the electronic device in a geographic region or the network or one or more allowed or excluded providers of the software used by the instances of the electronic device in the geographic region or the network; and
selectively performing a remedial action based at least in part on the calculated compliance.

21. The method of claim 20, wherein the method comprises accessing stored location information associated with the electronic device based at least in part on the trusted identity; and
wherein the calculating of the compliance is based at least in part on the location information.

* * * * *